United States Patent [19]
Amann

[11] 3,917,382
[45] Nov. 4, 1975

[54] HIGHWAY TRAFFIC GUIDE DEVICE
[76] Inventor: Mario Amann, Magnusstrasse 25, 896 Sankt Mang, Germany
[22] Filed: Aug. 1, 1974
[21] Appl. No.: 494,349

Related U.S. Application Data
[63] Continuation-in-part of Ser. No. 362,762, May 22, 1973, abandoned.

[30] Foreign Application Priority Data
May 25, 1972 Germany............................ 2225307

[52] U.S. Cl. .................... 350/61; 350/97; 356/201; 116/63 P; 40/31; 350/289
[51] Int. Cl.²... G02B 11/04; G02B 5/12; E01F 9/10
[58] Field of Search .............. 350/61, 97, 289, 288; 116/63 R, 63 P; 40/31; 250/559, 548, 571; 246/474; 226/45; 356/201; 240/46.05, 46.03

[56] References Cited
UNITED STATES PATENTS
3,603,672  9/1971  Bastide ................................ 350/61

FOREIGN PATENTS OR APPLICATIONS
155,889    1/1953  Australia............................. 350/61
1,243,005  6/1967  Germany............................. 350/61

Primary Examiner—Vincent P. McGraw
Assistant Examiner—Jon W. Henry
Attorney, Agent, or Firm—Haseltine, Lake & Waters

[57] ABSTRACT

An illumination or reflection means for traffic guide devices or automobile headlamps for preventing reflection sections or light outlet openings from becoming obscured by dirt accumulation. In front of these reflection sections or light outlet openings a transparent foil web is moved intermittently in order to replace dirty sections there of by clean sections so that the reflection effect or lighting effect will be maintained even if a substantial dirt accumulation occurs. The movement of the transparent foil web is controlled by an electronic measuring device.

10 Claims, 9 Drawing Figures

HIGHWAY TRAFFIC GUIDE DEVICE

CROSS-RELATED APPLICATION

This application is a continuation-in-part of copending Application Ser. No. 362,762 filed May 22, 1973 and now abandoned.

Known highway traffic guide devices, especially road side posts having reflection sections and traffic signals or automobile headlamps having light outlet openings are disadvantageous because during the most important periods (hazy weather, fog, snow fall) when they are just required they are inefficient because their reflection sections or light outlet openings are dirty.

The reflection sections cannot be cleaned in short intervals by hand.

One object of the invention is to provide a traffic guide device or an automobile headlamp which is made self cleaning.

Another object of the invention is to provide a movable reflection element or a movable transparent element in front of a reflection element or illumination element, the movable element including a section exposed to atmospheric dirt accumulation and drive means for moving the movable element in order to replace the section having been exposed to atmospheric dirt accumulation by a clean section of the movable element.

A still further object of the invention is to provide control means to detect the degree of dirt accumulation on said movable element and to start the drive means for moving the movable element only when a predetermined value of dirt accumulation has been detected.

A still further object of the invention is to provide an electronic measuring device to detect the degree of dirt accumulation by measuring the intensity of light rays having passed a dirty section of the movable element or having been reflected by a dirty section of the movable element.

The invention brings the advantage that dirty sections of the movable element of an automobile headlamp or of a traffic guide device, for instance, guide post can be replaced by a clean section respectively in any short intervals, so that the reflection effect of the guide device or lighting effect of the headlamp is maintained though there is a great dirt accumulation per time unit. A controlling means is provided for controlling the number of indexings of the movable element dependent on the degree of dirt accumulation. By using a thin foil, a supply sufficient for one year or longer can be stored within the housing of the guide post and used, according to the demand, as automatically controlled by the controlling means dependent on the dirt accumulation. The driving voltage for an electric driving motor can be from a storage battery or from an external wiring system running along the road. If an external current supply is provided all guide devices or a group of guide devices can be controlled by a central station.

The invention will now be described in detail by way of examples.

Figure 1:
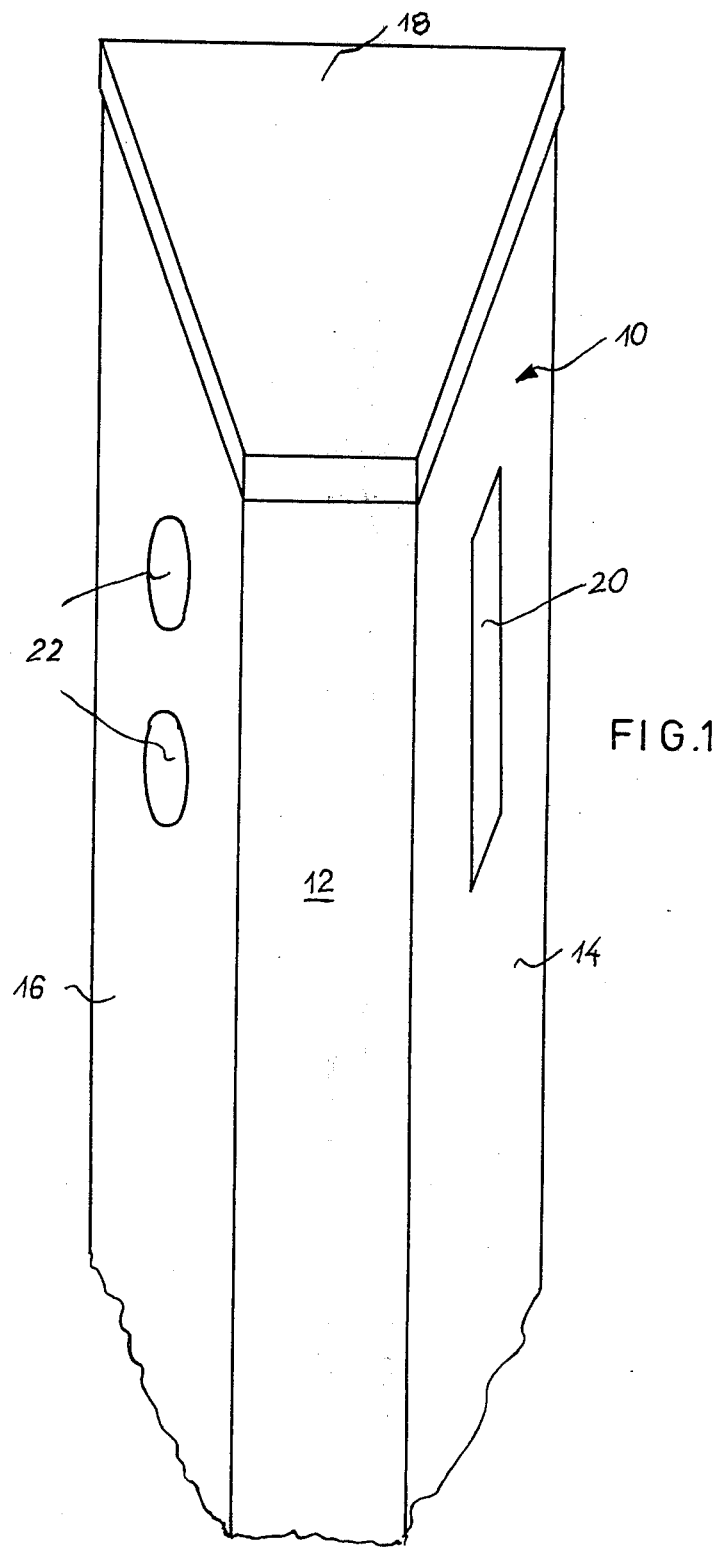
FIG. 1 is a perspective view of a road side post.

A road side post 10 is shown schematically having a front wall 12, side walls 14, 16 and a removable cap 18. The side walls 14, 16 are provided with openings 20, 22 behind which stationary reflection elements 50, 52 (FIG. 2); 152, 154 (FIG. 4); 252, 254 (FIG. 5) and 352, 354 (FIG. 6) are arranged in the housing of the post 10.

Two parallel vertical axles 26, 28 are arranged for free rotation in the housing. The axle 28 is connected with a driving motor to rotate a winding-on roller 30 fastened to the axle 28. The second axle 26 carries a supply roller 29 which includes a supply of two thin transparent foil webs 34, 36 which can be drawn off simultaneously. The foil webs are guided around sheaves 38, 42 then run through interspaces between openings 20, 22 and the reflection elements which are arranged at a small distance from the openings, then around another pair of sheaves 40, 42 to the common winding-on roller 30. When the motor is running the winding-on roller rotates in the direction of the arrow and draws off the pair of protective foil webs 34, 36 from the supply roller 29.

In a simple embodiment, the webs are continuously drawn off at low speed which is controlled by an apparatus measuring the dirt accumulation so that dirty sections of the webs are continuously replaced by clean sections. A substantial saving of web is obtained by intermittent operation controlled by a controlling device comprising a photovoltaic cell 13 which — via an opening in the housing — receives only the daylight but not the headlight of vehicles so that the driving motor will not be started before a predetermined degree of darkness is obtained. The intervals between each of the advance motions can be adjusted, for instance, one per hour. These intervals can be varied automatically in accordance with varying temperatures of the atmosphere by a temperature controlling device. When the ambient temperature decreases the intervals will become shorter.

According to an important embodiment, the controlling device controls two different driving motions, that is a test advance and a main advance. During the test advance the foil web is fed over only a short length from a first position where it was subjected to dirt accumulation during a predetermined period to a dirt measuring station, in which second position the web section is checked by a photoelectric measuring device 46 arranged in the moving path of the web. If the dirt accumulation is not sufficient, the driving motor will be stopped immediately. If the measuring device however shows dirt accumulation exceeding a predetermined value the drive runs on over the normal advance length of the web corresponding to the dimension of the openings 20, 22 in the moving direction of the web or runs as long as the measuring device 46 receives a clear web section (main advance).

Further foil web can be saved if the foil web itself is not used as test web but a separate small test web wound on separate rollers 31, 33 which are movable independent of the rollers 29, 30. According to FIG. 3 the rollers 31, 33 are arranged coaxially with respect to the rollers 29, 30. The roller 30 is arranged on hollow shaft 28 in which is rotatably supported axle 35. The axle 35 carries the test roller 33. In this embodiment only the axle 35 with the roller 33 is rotated during the testing period in order to advance the test web over a short length of for example one inch. Then the photoelectric measuring of the dirt accumulation takes place. If the measured value is small the motor will be stopped, if it exceeds a predetermined value however the motor will be drivingly connected to the hollow shaft 28, while the rotation of the axle 35 is stopped. The protective web then is moved over a whole advance length. Because the test web is subjected to much more indexings than the protective web but has smaller advance lengths the consumption of said two webs will be substantially equal. So the same web supply will be sufficient for a longer period. The respective supply can be refilled through an opening 11 in the cap of the housing.

The rollers with their axles and sheaves for the webs are supported on a carrier removably arranged in the housing so that the whole arrangement can be exchanged in a simple manner.

Instead of the transparent protective webs 34, 36 foil webs or belts can be used having a reflecting surface. In this case no stationary reflecting elements 50, 52 are used. The reflecting webs can be provided with translucent non-reflecting regions for the purpose of dirt testing. According to an alternative embodiment such reflecting webs can be used in connection with the small transparent test web wound on rollers 31, 33.

Figure 2:
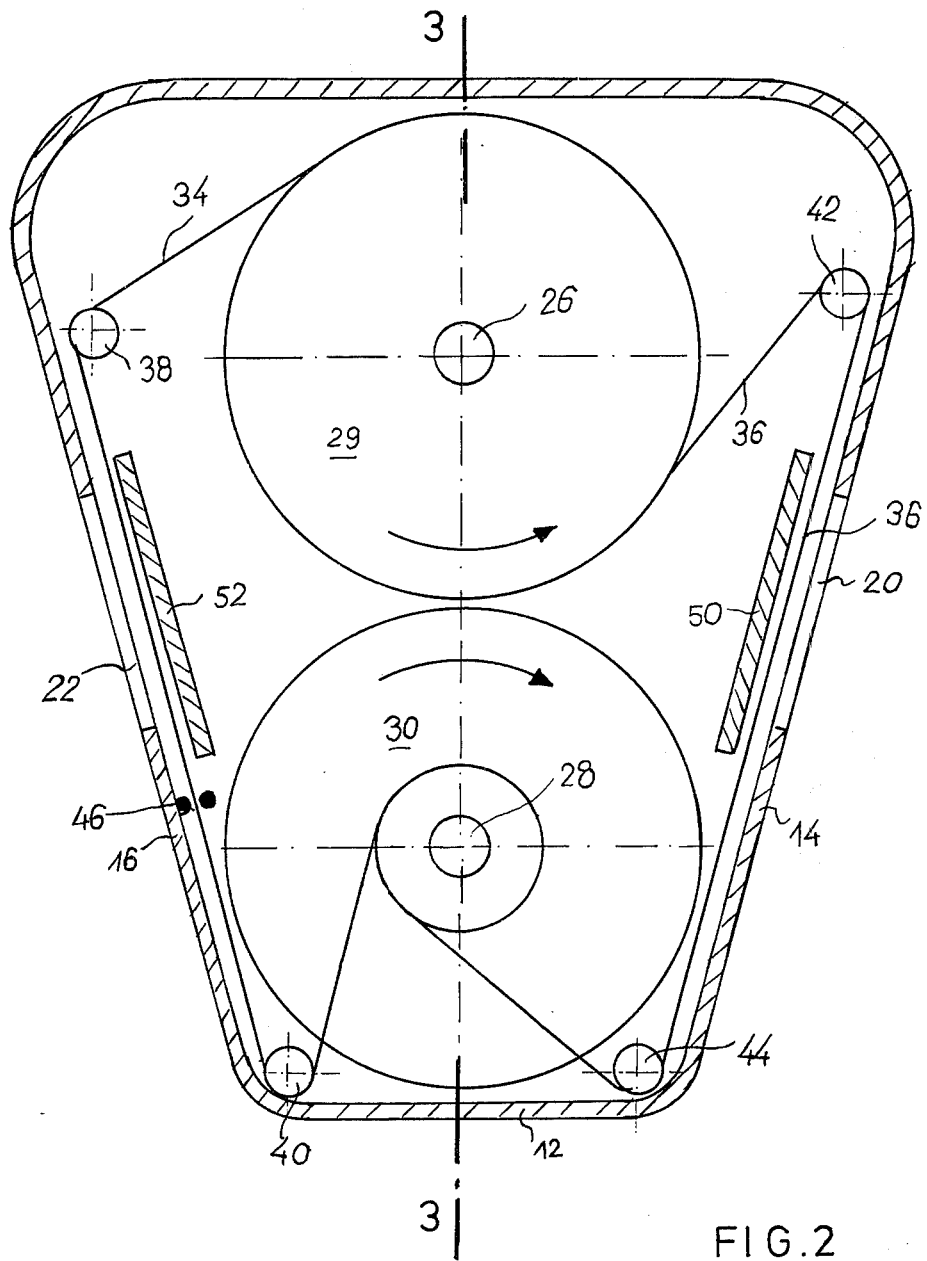
FIG. 2 is a horizontal cross-section of the road side post.
Figure 3:
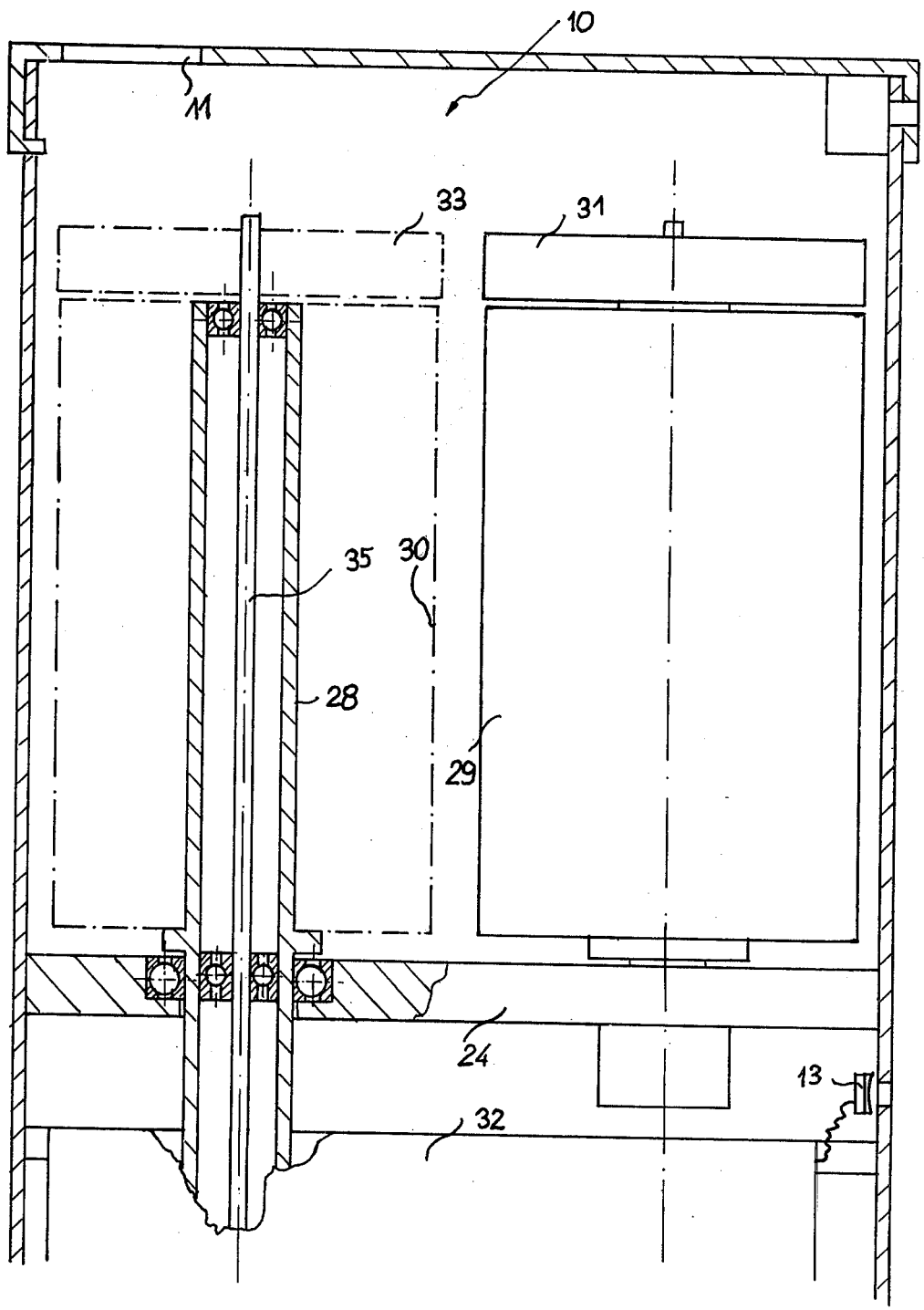
FIG. 3 is a longitudinal cross-section along line 3—3 of FIG. 2.
Figure 4:
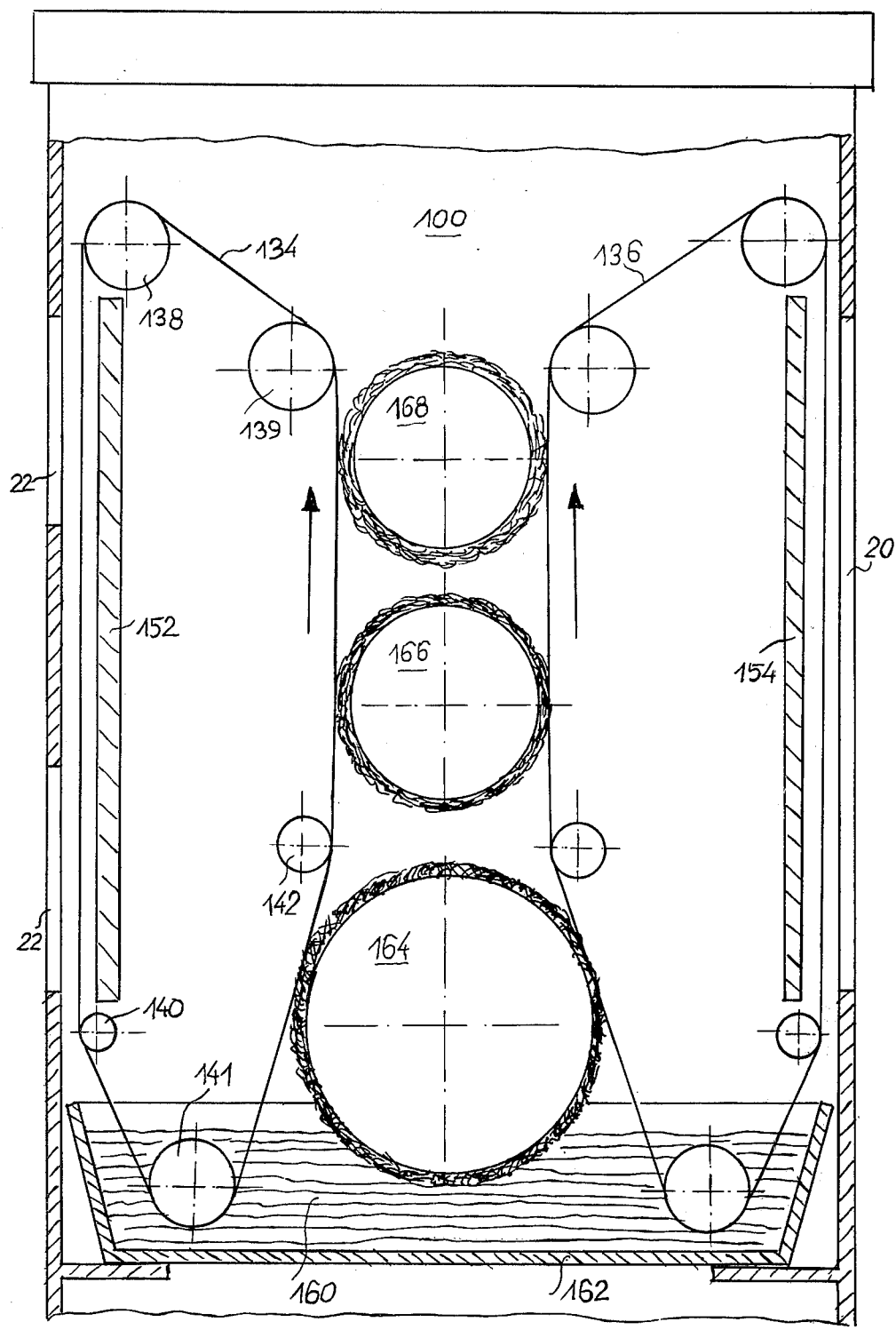
FIG. 4 is a vertical cross-section of another embodiment.

In the embodiment shown in FIGS. 2 and 3 the web motion speed is dependent on the winding diameter. In order to obtain a constant web speed a separate pair of driving rollers is preferred. FIG. 4 shows a guiding device 100 having two webs 134, 136 which are moved in vertical planes in contradiction to the aforesaid embodiment and which are formed as endless strips guided around sheaves 138 – 142. The strips 134, 136 run through a cleaning bath 160 and are in contact with cleaning rollers and brushing rollers 164 – 168. The cleaning liquid is contained in a removable cup 162.

Figure 5:
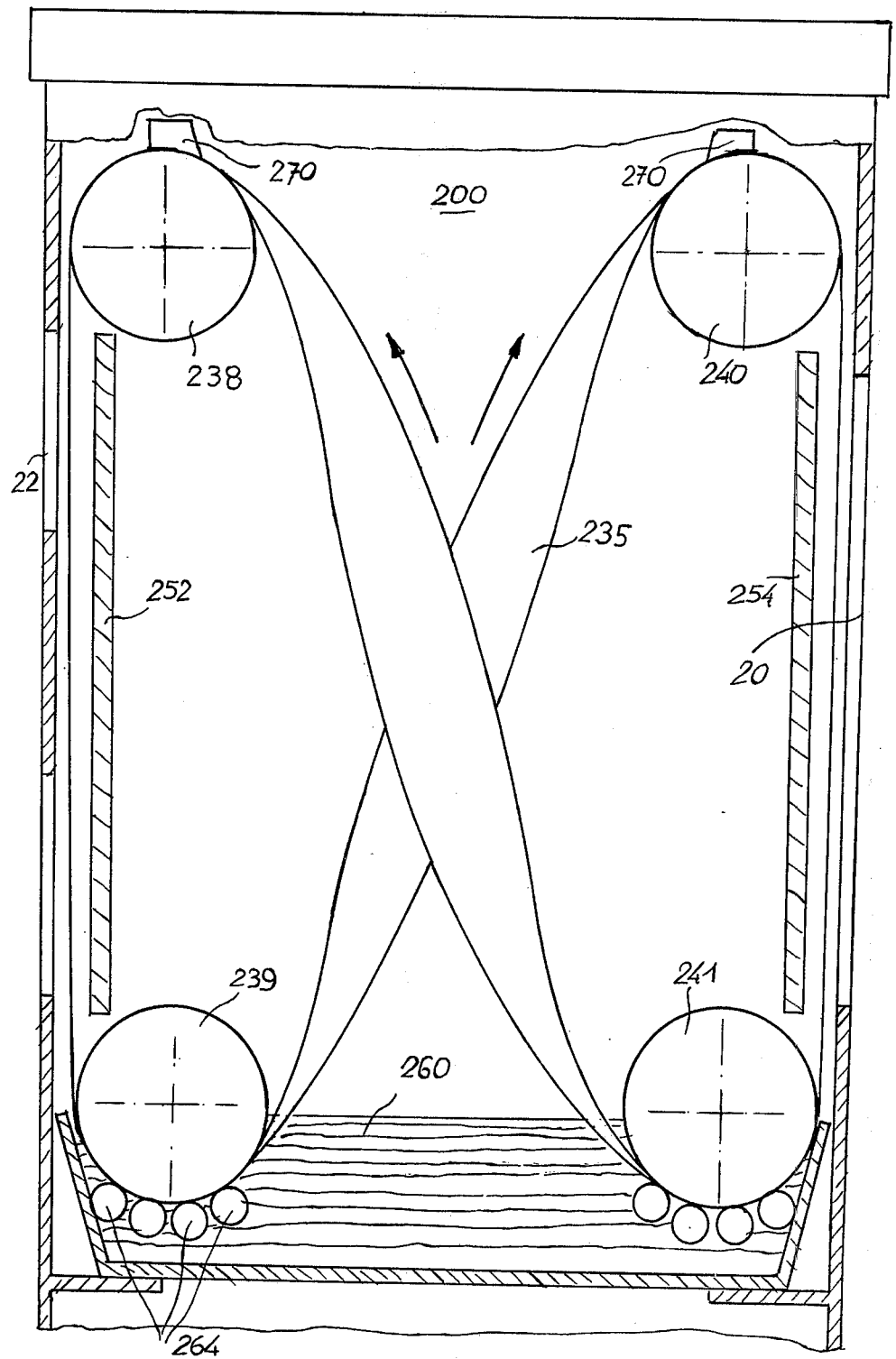
FIG. 5 is a vertical cross-section of a further embodiment.

In the embodiment of FIG. 5 a single endless web 235 is guided around two pairs of sheaves 238 – 241, through a cleaning bath 260 and subjected to the cleaning operation of rotating rollers 264 and stationary strip-off elements 270. Because of the special guiding of the web, the outer surface thereof runs along both of said openings 20, 22 in the same direction.

Figure 6:
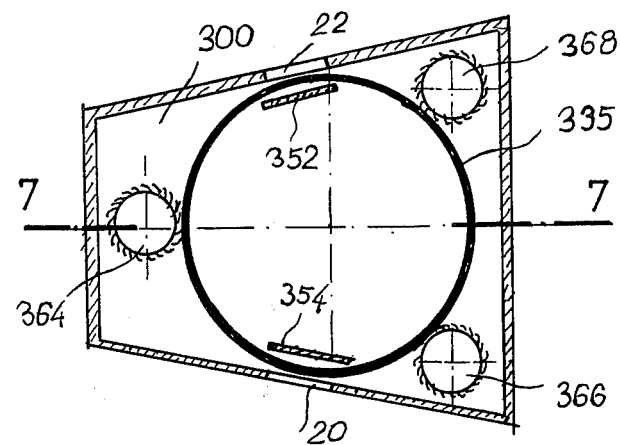
FIG. 6 is a horizontal cross-section of an embodiment comprising a rigid movable element.
Figure 7:
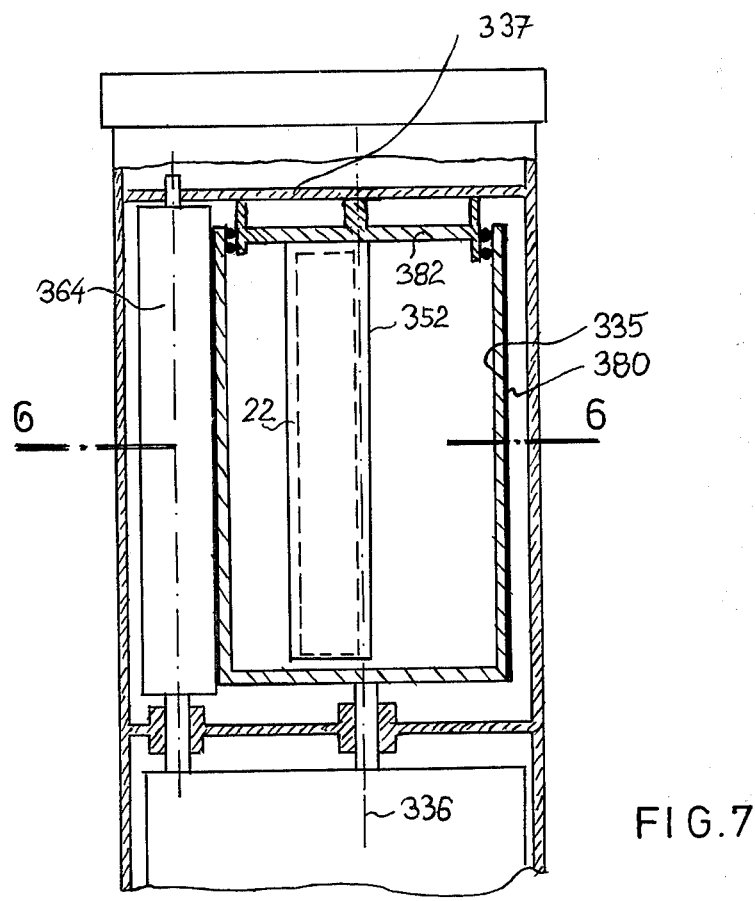
FIG. 7 is a longitudinal cross-section of the embodiment of FIG. 6.

Contrary to all aforesaid embodiments, the guide device 300 shown in FIGS. 6 and 7 has a rigid movable element consisting of a transparent cylinder 335 vertically arranged and being drivingly connected to a motor by means of a vertical shaft 336. The cylinder outer surface is in contact with cleaning brush drums 364 – 368 rotating in the opposite direction with respect to the cylinder. The cylinder 335 has an open upper end and is fastened to a support 382 which is arranged at an upper plate 337 of the housing. The cylinder has an outer layer 380 consisting of a low friction material such as polytetrafluoroethylene so that dirt cannot be deposited at the surface of the cylinder.

In all the aforesaid embodiments the web can also be provided with a low friction surface in order to reduce dirt accumulation. From the foregoing description it will be understood that in all mentioned embodiments, the movable element in the first case can be transparent and operates as a dirt protective element in front of a stationary reflector or lighting source while in the second case it can be provided with a reflecting surface for example formed as a thin foil web, endless belt or a rigid structure.

Figure 8:
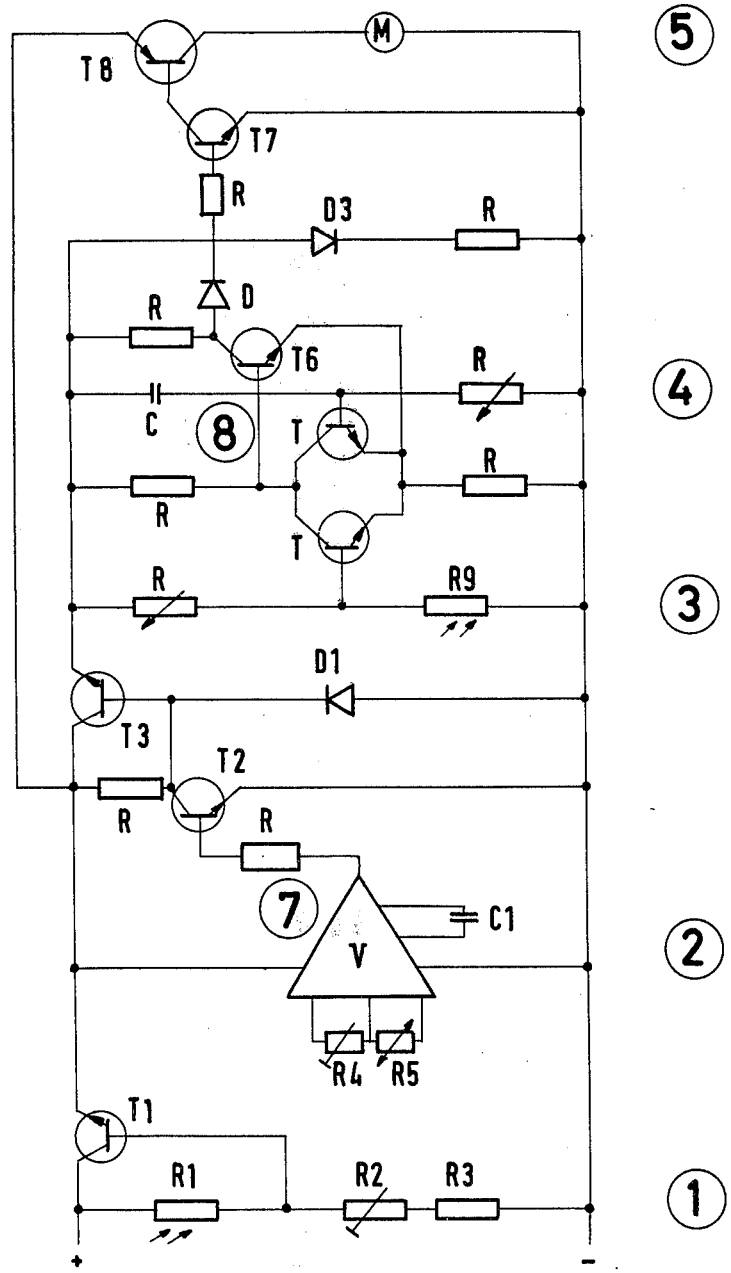
FIG. 8 is an electric wiring diagram for controlling the driving motor dependent on atmospheric influences and FIG. 9 is a cross-section of an automobile headlamp.

The electric circuit of the controlling device shown in FIG. 8 has resistances R, condensers D, diodes D, transistors T, integrated amplifiers V' and a driving motor M wired in the shown way. The numbers 1 to 5 designate the main elements: daylight control 1, cycle generator and temperature control 2, dirt control 3, advance 4 and drive 5.

When a predetermined value of darkness is obtained, a photoelectric resistance R1 becomes high in resistance and a transistor T1 becomes conductive via an adjusting potentiometer R2. Now a cycle generator 7 consisting of an integrated amplifier V with temperatur control is energized. The cycle generator 7 is connected with an adjusting potentiometer R4 and a temperature dependent resistance R5 (hot conductor) respectively and a condenser C1. The hot conductor R5 automatically controls the cycle time. When the ambient temperature decreases, the cycle intervals become shorter. When the inner circuit of the integrated amplifier V turns the transistor T2 becomes conductive and controls the base of a transistor switch T3 via the commutator. The base of the transistor T3 is stabilized by a Zener diode D1. Now a difference amplifier 8 is energized and two end transistors T7, T8 are energized via a RC-member and the following switch transistor T6. Motor M starts and will run until it is stopped by the RC-member. The foregoing circuit represents the "test circuit" in order to index the movable element over a small test length.

At the same time a light sensitive gate (Ga - AS diode transmitter D3 and photoelectric resistance R9) of the difference amplifier 8 determines whether the movable element is dirty or not. In the first case the drive operates until a clean section of the movable element arrives at the measuring zone. Additionally this operation is timely controlled by the cycle generator 7 by the fact that the transistor switch T3 opens after a predetermined period.

The motor M starts again at the end of the period of the indexing interval adjusted at the cycle generator and automatically controlled by the ambient temperature.

Figure 9:
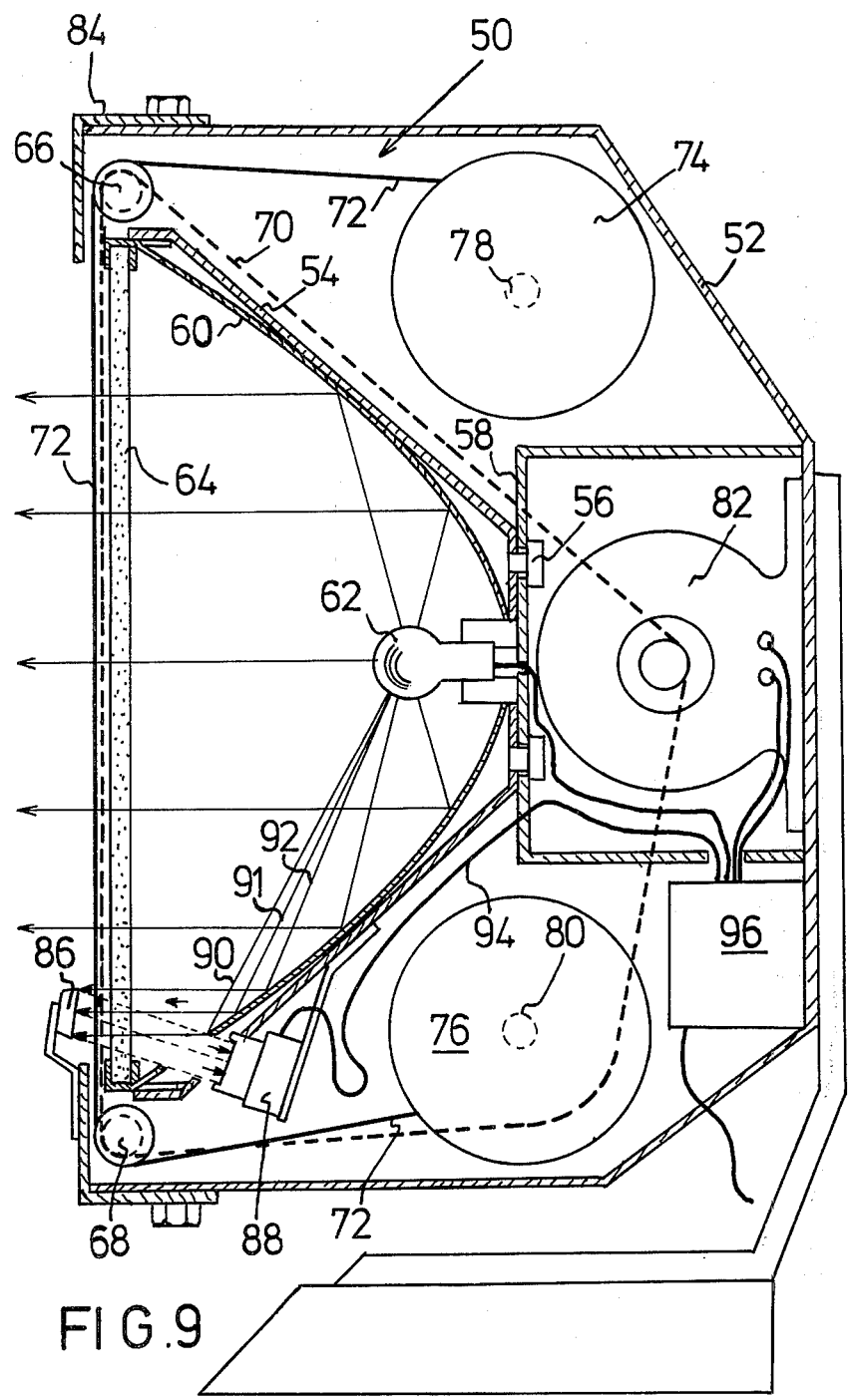

FIG. 9 shows an automobile headlamp, which comprises a housing 52, a frame 54 detachably fastened by means of connecting elements 56 at an inner wall 58 of the housing; a reflection shield 60 fastened at frame 54 an illumination element 62 within the shield 60 and a transparent glass front wall 64 closing the front side of the shield. Above and below the glass front wall 64 guide and drive rollers 66, 68 respectively are rotatably supported in side walls of the housing 52. Both of said rollers 66, 68 are drivingly connected at their ends by endless belts or chains 70 each of which being guided in a plane adjacent to the side walls of the housing respectively.

A supply roller 74, which includes a supply of an transparent foil web 72 and a winding-on roller 76 are radially detachably fastened to axles 78, 80 respectively, which are rotatably arranged at the side walls of the housing. The web foil 72 is drawn off from the supply roller 74 by the upper drive roller 66 and guided at a small distance in front of the headlamp front glass 64 to the lower drive roller 68 and around said roller to the winding-on roller 76, the axle 80 thereof is coupled by means of sliding clutches to driving wheels at both ends of the axles 80 engaged by said belts 70 which are driven by a drive motor 82 fastened at a rear wall of the housing.

At the front side of the housing a cap 84 is detachably fastened. When the cap is removed the frame 54 including the reflection shield can be removed and the housing is accessible to change the rollers.

At the lower margin of the cap 84 a small mirror 86 is fastened at a distance in front of the foil web 72. A photocell 88 is fastened at the rear side of the reflection shield 60 and an opening being provided in the shield 60 in front of the photocell 88, so that light rays 90, 91, 92 are reflected by the shield 60 to the mirror 86 and from the mirror through the opening in the shield to the photocell if the mirror is fastened at a correct inclination.

If the section of the web foil 72 in front of the glass 64 becomes dirty the intensity of the light rays passing said dirty web foil two times becomes less. This weakening of the light intensity received from the photocell corresponds to the degree of dirt accumulation on the foil web. When the light intensity received from the photocell and transmitted via circuit 94 to a control device 96 falls below a predetermined value the control device 96 will start motor 82. Motor 82 is stopped when the dirty section of web foil 72 has been replaced by a clean section.

The described arrangement can be simplified, if the signal produced by the control device 96 instead of being transmitted to the motor 82 is used to energize a pilot lamp arranged at the dashboard of the vehicle. The driver then is informed that the headlamp outlet opening is contaminated so that he can operate by hand a mechanical drive system for indexing the foil web. The installed drive motor 82 in this simplified embodiment is not used.

I claim:

1. A highway traffic guide device comprising a hollow housing, at least one reflection element mounted in the housing, a transparent element arranged within the housing and including a section lying in front of the reflection element and exposed to atmospheric dirt accumulation, means supporting the transparent element for movement, drive means for moving the transparent element past said reflection element, control means for starting said drive means intermittently to move said section which is exposed to atmospheric dirt accumulation and replace it by an adjacent clean section of the transparent element, said control means comprising a measuring device arranged in the moving path of the exposed section of the transparent element to determine whether the dirt accumulation on the exposed section of the transparent element exceeds a predetermined value and to control the operation of the drive means in dependence on said determination.

2. A highway traffic guide device as claimed in claim 1, wherein said control means includes means for activating said drive means periodically until only a portion of the section which has been exposed to dirt accumulation reaches the measuring device whereafter the drive means is selectively deenergized dependent on the determination by the measuring device either to stop the movement of the movable element after a short testing advance or to complete a full advance sufficient to replace a dirty section by a clean section of the movable element.

3. A highway traffic guide device as claimed in claim 1, wherein said movable element comprise a flexible foil web, and further comprising a test web of smaller width than the first said web and arranged parallel thereto, said test web and foil web being supported for independent movement, said test web being operatively coupled with said measuring device to be periodically advanced over small constant lengths while the foil web is displaced over a full advance only when the drive means receives a corresponding signal from the measuring device.

4. A highway traffic guide device as claimed in claim 1 comprising daylight sensitive means supported by said housing for holding the drive means deenergized in an inoperative condition, during daylight periods.

5. A highway traffic guide device as claimed in claim 1, comprising temperature controlling means supported by said housing for adjusting the period between each two test operations automatically dependent on the ambient temperature such that the cycle intervals become shorter when the ambient temperature decreases.

6. A highway traffic guide device comprising a hollow housing, at least one reflection element movably arranged within the housing and including at least one section exposed to atmospheric dirt accumulation, driving means disposed within the housing for moving said movable element, control means for intermittently operating said drive means to move the section exposed to atmospheric dirt accumulation and replace it by an adjacent clean section of the movable element, said control means including a measuring device arranged in the moving path of the exposed section of the movable element to determine whether the dirt accumulation on the exposed section of the movable element exceeds a predetermined value and to control the operation of the drive means in dependence on said determination.

7. A highway traffic guide device as claimed in claim 6, wherein said control means includes means for activating said drive means periodically until only a portion of the section which has been exposed to dirt accumulation reaches the measuring device whereafter the drive means is selectively deenergized dependent on the determination by the measuring device either to stop the movement of the movable element after a short testing advance or to complete a full advance sufficient to replace a dirty section by a clean section of the movable element.

8. A highway traffic guide device as claimed in claim 6, wherein said movable element comprises a flexible foil web, and further comprising a test web of smaller width than the first said web and arranged parallel thereto, said test web and foil web being supported for independent movement, said test web being operatively coupled with said measuring device to be periodically advanced over small constant lengths while the foil web is displaced over a full advance only when the drive means receives a corresponding signal from the measuring device.

9. A highway traffic guide device as claimed in claim 6 comprising daylight sensitive means supported by said housing for holding the drive means deenergized in an inoperative condition, during daylight periods.

10. A highway traffic guide device as claimed in claim 6 comprising temperature controlling means supported by said housing for adjusting the period between each two test operations automatically dependent on the ambient temperature such, that the cycle intervals become shorter when the ambient temperature decreases.

* * * * *